United States Patent [19]

Himeshima et al.

[11] Patent Number: 5,693,399
[45] Date of Patent: Dec. 2, 1997

[54] VACUUM HEAT INSULATOR

[75] Inventors: Tomoharu Himeshima; Takayuki Watanabe, both of Tokyo, Japan

[73] Assignee: Mitsubishi Gas Chemical Company, Inc., Tokyo, Japan

[21] Appl. No.: 627,979

[22] Filed: Apr. 4, 1996

[30] Foreign Application Priority Data

Apr. 14, 1995 [JP] Japan .......................... HEI. 7-089209

[51] Int. Cl.$^6$ .......................................... B32B 1/06
[52] U.S. Cl. .......................... 428/69; 428/76; 52/406.2
[58] Field of Search .................. 428/69, 76; 52/406.2

[56] References Cited

U.S. PATENT DOCUMENTS 5,532,034  7/1996  Kirby et al. .......................... 428/69

*Primary Examiner*—Alexander Thomas
*Attorney, Agent, or Firm*—Sughrue, Mion, Zinn, Macpeak & Seas, PLLC

[57] ABSTRACT

A vacuum heat insulator comprising an oxygen absorbent which does not require water to absorb oxygen, a dehydrating agent and an acidic gas absorbent. In a preferred embodiment, the oxygen absorbent comprises (i) at least one of an unsaturated fatty acid compound and a chain hydrocarbon polymer having an unsaturated group as a main component, and (ii) an oxygen absorbent accelerator. When arranged in a vacuum container or vacuum package, the vacuum heat insulator absorbs oxygen, water and acidic gases which permeate the vacuum container or package or which are generated within the vacuum container or package, to thereby maintain the degree of vacuum and good thermal insulating properties.

23 Claims, 2 Drawing Sheets

VACUUM HEAT INSULATOR

BACKGROUND OF THE INVENTION

1. Field of the Invention

The present invention relates to a vacuum heat insulator for use in a refrigerator or freezer.

2. Description of the Related Art

It is known in the art to provide a vacuum layer for thermally insulating a thermos bottle. The vacuum layer suppresses thermal convection to thereby obtain high thermal insulating properties.

Known vacuum heat insulators for use in a refrigerator or freezer include core material, such as an inorganic material (e.g., glass fiber, asbestos, calcium silicate or ceramic foam) and an organic material (e.g., an expanded polyurethane, an expanded polystyrene, an expanded polyethylene, foam rubber, phenol foam, etc.), which materials are packed in a plastic laminated package under vacuum at a pressure of up to 1 torr to provide a heat transfer rate of 0.01 kcal/m.h. °C. or less.

In these conventional vacuum insulants, air, water vapor or an acidic gas (e.g., carbon dioxide gas) permeate the plastic laminated package to a small extent. The degree of vacuum is lowered with the passage of time and the heat transfer rate increases. As a result, high thermal insulating properties cannot be maintained.

Furthermore, in a system comprising urethane, etc., as a heat insulator, residual solvents and gases such as carbon dioxide used to prepare or expand the urethane are generated by the heat insulator to thereby lower the degree of vacuum.

When the degree of vacuum is lowered, the thermal insulating capability decreases. In the case of a refrigerator or freezer, power consumption increases and as a result the running cost also increases.

A conventional technique for solving the above described problems is proposed in unexamined published Japanese Application Nos. Sho 58-104081 and Sho 59-225275. These patent publications teach the addition of a molecular sieve such as a zeolite as an adsorbent for air (oxygen and nitrogen), or the addition of a moisture absorbent such as zeolite, silica gel or calcium chloride to the heat insulator.

However, these adsorbents only remove air (oxygen) or moisture by means of adsorption. Thus, this technique is inadequate because the adsorbed gases desorb over a period of time and with a change in temperature.

Furthermore, as disclosed in unexamined published Japanese Application No. Sho 63-105392, it is known to add a metal powder to a heat insulator as an oxygen or moisture absorbent. However, water (moisture) is required in the oxygen absorption reaction. The oxygen absorption reaction does not proceed in the absence of rarer, and oxygen which permeates the vacuum vessel is not absorbed.

Furthermore, known oxygen absorbents other than a metal powder cannot be used in combination with a dehydrating agent, because water is required for the oxygen absorption reaction.

SUMMARY OF THE INVENTION

An object of the present invention is to provide a vacuum heat insulator which maintains its thermal insulating properties by suppressing a loss in vacuum over time.

The present inventors have found that the above-described objects can be achieved by using in combination an oxygen absorbent, a dehydrating agent and an acidic gas absorbent.

That is, the present inventors have found that by removing oxygen, moisture and acidic gases (e.g., carbon dioxide) which permeate the vacuum vessel or are generated by a vacuum heat insulator, the degree of vacuum and the thermal insulating properties are maintained.

That is, in the present invention, an oxygen absorbent which does not require water to absorb oxygen, a dehydrating agent and an acidic gas absorbent are encapsuled, added or incorporated into the vacuum heat insulator.

In a vacuum heat insulator which is charged into a plastic film laminate package and which is maintained under vacuum, an oxygen absorbent, a dehydrating agent and an acidic gas absorbent are added or incorporated therein. The heat insulator simultaneously absorbs oxygen, water and acidic gases which slowly permeate the plastic film laminate package or which are generated by the charged heat insulator. The initial degree of vacuum is maintained to the extent possible to thereby maintain the initial thermal insulating properties of the vacuum heat insulator. Thus, the present invention is of great practical value.

DETAILED DESCRIPTION OF THE INVENTION

Figure 1:
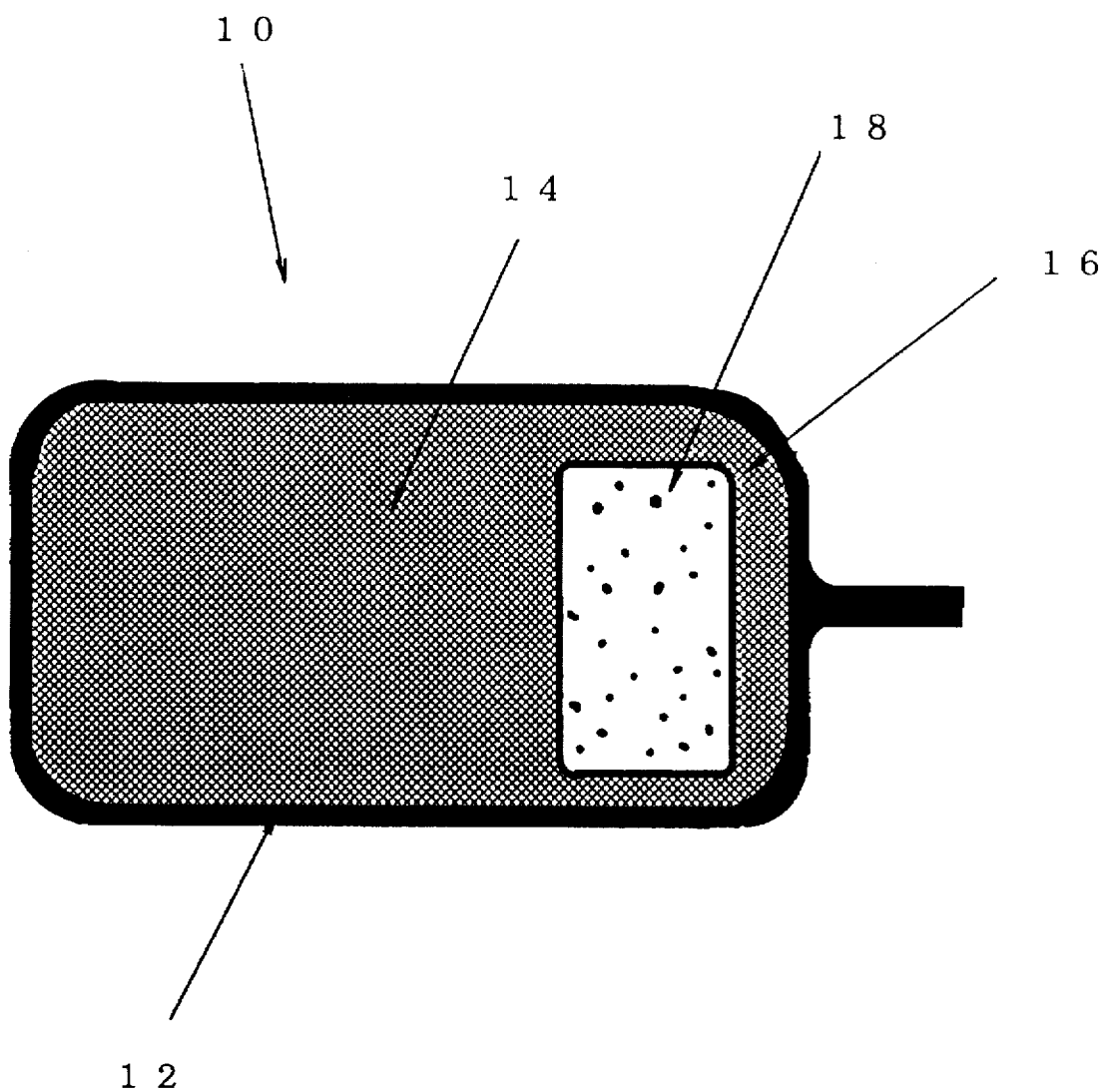
FIG. 1 is a example of schematic illustration of a vacuum heat insulator in which getters are incorporated in a packet.

The oxygen absorbent for use in the present invention may be any oxygen absorbent which does not require water to absorb oxygen. The oxygen absorbent may contain an unsaturated fatty acid compound and/or a unsaturated organic compound, such as a chain hydrocarbon polymer having an unsaturated group, as a main component and an oxygen absorption accelerator, such as a transitional metal salt etc., and optionally a carrier substance.

The oxygen absorbent may preferably contain an unsaturated fatty acid compound and/or a chain hydrocarbon polymer having an unsaturated group and a thermoplastic polymer, such as polyamide or polyolefin as a main component and an oxygen absorption accelerator.

Known oxygen absorbents contain metals or metal salts such as sulfites, iron powder and iron salts; or contain organic compounds such as catechol and ascorbic acid.

However, these oxygen absorbents require water for oxygen absorption. And when used under dry conditions, it is necessary to add water to activate the oxygen absorbent.

In a vacuum heat insulator, the inner part of the closed system must remain under vacuum, and the amount of residual gas including water vapor must be minimized. Thus, adding water to the oxygen absorbent and using it in a vacuum heat insulator is not a practical solution because this amounts to increasing the water content of the vacuum heat insulator.

Furthermore, when the above noted oxygen absorbent is used without adding water, oxygen absorption does not occur and it is difficult to maintain the degree of vacuum.

On the other hand, the oxygen absorbent for use in the present invention preferably comprises an unsaturated fatty acid compound and/or a chain hydrocarbon polymer having an unsaturated group as a main component, an oxygen absorption accelerator. The oxygen absorbent may further comprise a carrier substance.

The unsaturated fatty acid compound for use in the present invention is an unsaturated fatty acid having 10 or more carbon atoms with at least one double bond between adjacent carbon atoms, or a salt or an ester of the unsaturated fatty acid.

The salt or the ester of the unsaturated fatty acid may contain a substituent such as a hydroxyl group, a formyl group, etc. Furthermore, the unsaturated fatty acid compound is not necessarily a pure substance.

Examples of the unsaturated fatty acid compound include an unsaturated fatty acid such as oleic acid, linoleic acid, linolenic acid, arachidonic acid, parinaric acid, dimer acid, ricinoleic acid, etc.,; fats and oils containing esters of the unsaturated fatty acid, e.g., soybean oil; and esters and metal salts of the unsaturated fatty acid.

Furthermore, fatty acids obtained from animal or plant oils, e.g., linseed oil fatty acid, soybean oil fatty acid, tung oil fatty acid, rice-bran oil fatty acid, sesame oil fatty acid, cottonseed oil fatty acid, rapeseed oil fatty acid, tall oil etc., may be used as the unsaturated fatty acid.

The chain hydrocarbon polymer having an unsaturated group for use in the present invention includes a chain hydrocarbon polymer and derivatives thereof having 10 or more carbon atoms and at least one double bond between adjacent carbon atoms. The derivatives may contain a substituent such as a hydroxyl group, an amino group, a formyl group, a carboxyl group, etc.

The chain hydrocarbon polymer having an unsaturated group may comprise an oligomer or polymer of butadiene, isoprene, 1,3-pentadiene, etc.

The chain hydrocarbon polymer having an unsaturated group is not necessarily a pure substance, and may contain impurities such as a solvent within a limited range.

The oxygen absorbing accelerator may contain, for example, a metal salt which accelerates autoxidation of an organic compound or a radical initiator.

Preferred metal salts for use as the oxygen absorbing accelerator include transition metal salts of Cu, Fe, Co, Ni, Cr, Mn, etc., and the transition metal salt may be, for example, an unsaturated fatty acid transition metal salt.

In case that the main component of the oxygen absorbent is liquid, the oxygen absorbent is preferably used in impregnating to carrier.

The carrier substance comprises, for example, a paper or a synthetic paper made from natural pulp or synthetic pulp, silica gel, alumina, activated carbon, zeolite, pearlite, activated clay, etc. Particularly, when the oxygen absorbent comprises a liquid as a main component, an adsorptive substance is preferably used as a carrier substance.

Furthermore, in a preferred embodiment, the substance which is selected as a dehydrating agent also serves as the carrier, to thereby impart a dehydrating ability to the carrier substance.

The acidic gas absorbent may be a substance which is able to absorb or adsorb either 1) an acidic gas which is produced by a reaction of the main component of the oxygen absorbent, or which permeates into the vacuum system, or 2) carbon dioxide gas, etc., which generate from the core material. For example, an oxide, hydroxide, carbonate, organic acid salt or organic amine of an alkali metal or an alkaline earth metal may be used as the acidic gas absorbent.

Furthermore, the carrier substance or dehydrating agent may be selected so as to also function as an acidic gas absorbent. In that case, addition of a separate acidic gas absorbent is not necessary.

The ratio of components constituting the oxygen absorbent is from 0.01 to 40, preferably from 0.1 to 10 parts by weight of an oxidation accelerating agent and from 1 to 5,000, preferably from 10 to 1000 parts by weight of a carrier substance per 100 parts by weight of a main component selected from an unsaturated fatty acid compound and a chain hydrocarbon polymer having an unsaturated group.

When the main component of the oxygen absorbent is a liquid, it is preferably supported on a carrier substance. The above components are mixed, and the oxygen absorbent is used in the form of powder, particles, granules, a tablet, a sheet, etc.

The oxygen absorbent may be used directly, but it is usually contained in a package comprising a wrapping material which is permeable to oxygen. The wrapping material comprises a paper or a nonwoven paper as a basic material.

The form of the package is not particularly limited, and the package can be in the form of a packet, sheet or blister package.

Furthermore, silica, diatomaceous earth and pearlite which are used as materials of the heat insulator may be selected as the carrier substance, to thereby impart an oxygen absorbing property to the heat insulator itself.

The dehydrating agent for use in the present invention includes, for example, a paper or synthetic paper comprising a natural pulp or a synthetic pulp, silica gel, alumina, activated carbon, zeolite, pearlite, activated clay, quick lime, barium oxide, calcium chloride, barium bromide, calcium sulfate, magnesium chloride, magnesium oxide, magnesium sulfate, aluminum sulfate, sodium sulfate, sodium carbonate, potassium carbonate, zinc chloride, etc.

The dehydrating agent may be used directly or in the form of a package, or may be used in admixture with the above described oxygen absorbent.

Figure 2:
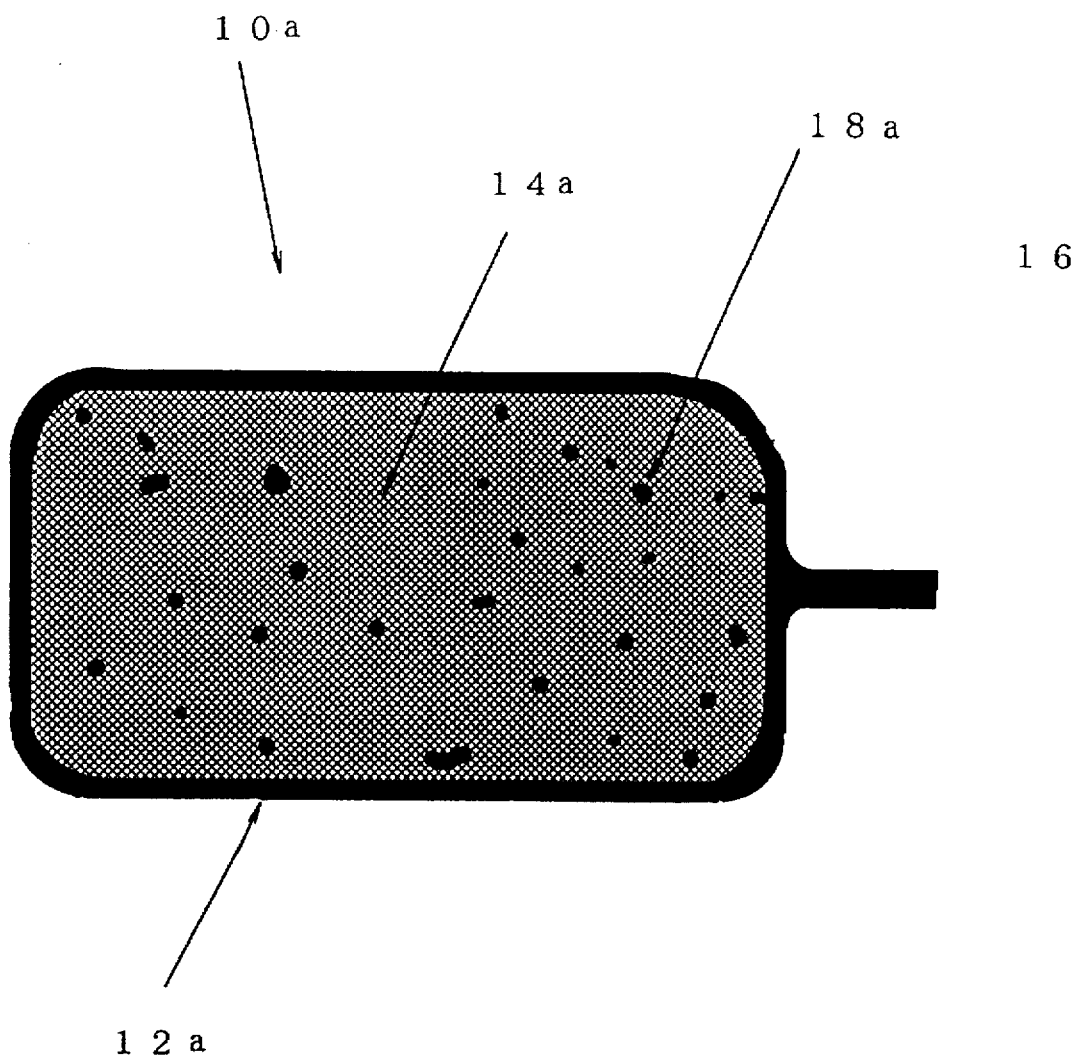
FIG. 2 is a example of schematic illustration of a vacuum heat insulator in which getters are added or incorporated in a core material.

The vacuum heat insulator 10, 10a, for use in the present invention comprises a core material 14, 14a, which can maintains shape and prevent convection, a package 12, 12a, having gas barrier properties which can intercept the open air and getters 18, 18a, comprising an oxygen absorbent, a dehydrating agent and an acidic gas absorbent, as illustrated schematically in FIG. 1 and FIG. 2.

The core material 14, 14a, used for the present invention may be an open-cell foamed plastic, such as polyurethane or polystyrene; an inorganic fine powder, such as silica, diatomaceous earth, pearlite, magnesium carbonate and calcium silicate, etc.; a molded plate having multipore, such as, a calcium silicate plate or a asbest plate; and fibrous substance, such as, a glass fiber, ceramic fiber and polyester fiber. And, silica powder or open-cell foamed urethane is preferably used. These core material may be used both in single or in combination of several kinds.

The package having gas barrier properties which contains the vacuum heat insulator of the present invention may be a laminated package having at least one type of film where a metal foil, such as Al, or a metal oxide, such as silicon oxide, is deposited on a polyvinylidene chloride, polyvinylalcohol, polyester, polypropylene, polyamide or polyethylene film. The package is laminated in more than one layer. Furthermore, the package is constructed to provide good gas barrier properties. However, it is impossible to entirely prevent water and gas from permeating the vacuum package.

Further, the most inner layer of the package may comprise a sealant material such as a resin capable of heat sealing. Examples thereof include polyethylene and polypropylene.

The amount of the oxygen absorbent may be from 0.1 to 10 parts, preferably from 0.5 to 5 parts by weight per 100 parts by weight of the core material. Also, the oxygen absorbent is added in an amount sufficient to absorb the oxygen present in the space volume of the sealed package.

The amount of the dehydrating agent is preferably from 0.5 to 50, preferably from 1 to 20 parts by weight per 100 parts by weight of the core material. Also, the dehydrating agent is added in an amount sufficient to absorb the water present in the space volume of the sealed package.

The amount of the acidic gas absorbent may be from 0.5 to 20, preferably from 1 to 10 parts by weight per 100 parts by weight of the core material. Also, the acidic gas absorbent is added in an amount sufficient to absorb the acidic gas (e.g., carbon dioxide) present in the space volume of the sealed package.

The amount of the oxygen absorbent, the dehydrating agent and the acidic gas absorbent can be suitably selected depending on the kind of the barrier properties of the package and the core material.

EXAMPLES

The present invention will be explained in more detail in the following Examples. However, the present invention should not be construed as being limited to these Examples.

In the following Examples, the heat transfer rate was measured at a temperature difference of between 13° C. and 35° C. using a thermal conductivity meter "QTM type" manufactured by Showa Denko K. K., Japan.

Example 1

3.5 g of a zeolite were added to a mixture of 1 g of soybean oil and 0.2 g of cobalt naphthenate, and mixed with a blender. Then, the mixture was allowed to stand at 25° C. for 10 minutes to obtain a flowable powder. To the thus obtained 4.7 g of powder were mixed 2.5 g of quick lime and 1.0 g of slaked lime to prepare a deoxygenating agent.

5 Parts by weight of the above getters (18 in FIG. 1) was charged into a packet (16) made of poly (ethyleneterephthalate)/polypropylene having a plurality of vent holes or pores, and the open end was heat-sealed to make an oxygen permeable package containing a getters (18). Then, the permeable package (16) and 100 parts by weight of dried pearlite powder (mean particle size of 3 μm) as core material were placed into a vacuum package made of stretched polypropylene/aluminum deposited on poly (ethyleneterephtalate)/polyethylene.

The open end of the vacuum package was heat-sealed in a vacuum packaging machine having a heat sealing apparatus under a vacuum of 0.1 tort, to thereby obtain a vacuum heat insulator having a size of 300×300 mm and a thickness of 20 mm.

The heat transfer rate was measured after storing the heat insulator for 90 days under conditions of 40° C. and 95% RH. The results are shown in Table 1 below.

Example 2

The same procedures were followed as in Example 1, except that tall oil fatty acid was used instead of soybean oil. The results are shown in Table 1.

Example 3

The same procedures were followed as in Example 1, except that cobalt tall oil fatty acid cobalt salt was used instead of cobalt naphthenate. The results are shown in Table 1.

Examples 4–10

The same procedures were followed as in Example 1, except that parts and components indicated in Table 1 were used. The results are shown in Table 1.

Example 11

The same procedures were followed as in Example 1, except that 0.6 g of soybean oil/0.4 g of liquid polyisoprene polymer ("DYNAKRIN R113" manufactured by Japan Synthetic Rubber Co.) were used instead of 1 g of soybean oil. The results are shown in Table 1.

Example 12

The same procedures were followed as in Example 11, except that the liquid polybutadiene ("POLYOIL 110" manufactured by Nippon Zeon Co., Ltd.) was used instead of liquid polyisoprene polymer. The results are shown in Table 1.

Example 13

The same procedures were followed and the resulting product was evaluated as in Example 1, except that the above getters were not charged into the permeable packet.

The results are shown in Table 2.

Comparative Examples 1–5

The same procedures were followed as in Example 1, except that the components and the parts indicated in Table 2 were used. The results are shown in Table 2.

Tables 1 and 2 show that after storage for 90 days at 40° C., 95% RH, there was a small change in thermal conductivity of the vacuum heat insulator having arranged, added or incorporated therein the getters of the present invention. Thus, the inventive vacuum heat insulator provided excellent protection against deterioration of thermal insulating properties.

TABLE 1

| | Example 1 | Example 2 | Example 3 | Example 4 | Example 5 |
|---|---|---|---|---|---|
| Main component of oxygen absorbent | soybean oil 0.61 | tall oil fatty acid 0.61 | soybean oil 0.61 | tall oil fatty acid 0.3 | sesame oil 0.05 |
| Oxygen absorbent accelerator | Co naphthenate 0.12 | Co naphthenate 0.12 | Co tall oil fatty acid 0.12 | Co tall oil fatty acid 0.02 | Mn tall oil fatty acid 0.02 |
| Carrier substance | zeolite 2.1 | zeolite 2.1 | zeolite 2.1 | zeolite 0.9 | aluminum oxide 0.5 |
| Dehydrating agent | quick lime 1.5 | quick lime 1.5 | quick lime 1.5 | zeolite 5.0 | zeolite 0.5 |
| Acidic gas absorbent | slaked lime 0.61 | slaked lime 0.61 | slaked lime 0.61 | slaked lime 6.5 | quick lime 0.5 |
| Package of getter | packet | packet | packet | packet | packet |
| Core material | pearlite 100 | pearlite 100 | pearlite 100 | polyurethane 100 | silica fine powder 100 |
| Initial Heat Transfer Rate | 0.005 | 0.005 | 0.005 | 0.005 | 0.005 |
| After storage at 40° C., 95% RH for 90 days | 0.006 | 0.006 | 0.006 | 0.006 | 0.006 |

TABLE 1-continued

|  | Example 6 | Example 7 | Example 8 | Example 9 | Example 10 |
|---|---|---|---|---|---|
| Main component of oxygen absorbent | cottonseed oil 0.05 | linseed oil 0.05 | oleic acid 0.61 | linoleic acid 0.61 | linolenic acid 0.61 |
| Oxygen absorbent accelerator | Co naphthenate 0.001 | Co naphthenate 0.0002 | Co octylate 0.12 | Mn octylate 0.12 | Fe oleate 0.12 |
| Carrier substance | zeolite 0.5 | zeolite 0.5 | zeolite 2.1 | zeolite 2.1 | zeolite 2.1 |
| Dehydrating agent | zeolite 0.5 | zeolite 0.5 | zeolite 30 | activated carbon 1.5 | Ca chloride 1.5 |
| Acidic gas absorbent | quick lime 0.5 | quick lime 0.5 | Mg oxide 0.61 | Mg chloride 20 | NaOH 0.61 |
| Package of getter | packet | packet | packet | packet | packet |
| Core material | polyurethane 100 | polyurethane 100 | pearlite 100 | pearlite 100 | pearlite 100 |
| Initial Heat Transfer Rate | 0.005 | 0.005 | 0.007 | 0.005 | 0.005 |
| After storage at 40° C., 95% RH for 90 days | 0.006 | 0.007 | 0.008 | 0.007 | 0.007 |

|  | Example 11 | Example 12 | Example 13 |
|---|---|---|---|
| Main component of oxygen absorbent | soybean oil/ liquid polyisoprene 0.61 | soybean oil/ liquid polybutadiene 0.61 | soybean oil 0.61 |
| Oxygen absorbent accelerator | Co naphthenate 0.12 | Co naphthenate 0.12 | Co naphthenate 0.12 |
| Carrier substance | zeolite 2.1 | zeolite 2.1 | zeolite 2.1 |
| Dehydrating agent | quick lime 1.5 | quick lime 1.5 | quick lime 1.5 |
| Acid gas absorbent | slaked lime 0.61 | slaked lime 0.61 | slaked lime 0.61 |
| Package of getter | packet | packet | no packet |
| Core material | pearlite 100 | pearlite 100 | pearlite 100 |
| Initial Heat Transfer Rate | 0.005 | 0.005 | 0.005 |
| After storage at 40° C.; 95% RH for 90 days | 0.006 | 0.006 | 0.006 |

Unit of the heat transfer rate: Kcal/m.h.°C.
Parts by weight

TABLE 2

|  | Comparative Example 1 | Comparative Example 2 | Comparative Example 3 | Comparative Example 4 | Comparative Example 5 |
|---|---|---|---|---|---|
| Main component of oxygen absorbent | none — | iron powder 5 | none — | none — | none — |
| Oxygen absorbent accelerator | — | — | — | — | — |
| Carrier substance | — | — | — | — | — |
| Dehydrating agent | — | — | silica gel | — | — |
| Acidic gas absorbent | — | — | — | — | — |
| Package of getter | none | packet | packet | none | none |
| Core material | pearlite 100 | pearlite 100 | pearlite 100 | silica fine powder 100 | polyurethane 100 |
| Initial Heat Transfer Rate | 0.004 | 0.004 | 0.005 | 0.005 | 0.005 |
| After storage at 40° C., 95% RH for 90 days | 0.038 | 0.016 | 0.019 | 0.030 | 0.026 |

Unit of the heat transfer rate: Kcal/m.h.°C.
Parts by weight
*specific surface of 2.5 m²/g and mean particle size of 120 μm.

The present invention is of great practical value. By arranging, adding or incorporating getters which can remove oxygen, moisture and acidic gas into a vacuum heat insulator which is maintained under vacuum and charged in a plastic laminate film container, gas which gradually permeates the laminate film container or gas which is gradually generated by the charged heat insulator is absorbed. Thus, the inherent thermal insulating property is maintained as long as the degree of vacuum is maintained.

It should further be apparent to those skilled in art that various changes in form and detail of the invention as shown and described above may be made. It is intended that such changes be included within the spirit and scope of the claims appended hereto.

What is claimed is:

1. A vacuum heat insulator comprising a package having gas barrier properties, a core material, an oxygen absorbent, a dehydrating agent and an acidic gas absorbent, wherein said core material, said oxygen absorbent, said dehydrating agent and said acidic gas absorbent are all contained within said package, and wherein said oxygen absorbent does not require water to absorb oxygen.

2. The vacuum heat insulator of claim 1, wherein said package having gas barrier properties is a package on which metal foil is laminated.

3. The vacuum heat insulator of claim 2, wherein said metal foil is Al.

4. The vacuum heat insulator of claim 1, wherein said core material is selected from the group consisting of an open-cell foamed plastic, an inorganic fine powder, a molded plate having multipore and fibrous substance.

5. The vacuum heat insulator of claim 4, wherein said open-cell foamed plastic is an open-cell foamed urethane.

6. The vacuum heat insulator of claim 4, wherein said inorganic fine powder is silica fine powder.

7. The vacuum heat insulator of claim 1, wherein said oxygen absorbent further comprises a carrier substance.

8. The vacuum heat insulator of claim 1, wherein said oxygen absorbent which does not require water to absorb oxygen is an oxygen absorbent which comprises (i) an unsaturated fatty acid compound and/or a chain hydrocarbon polymer having an unsaturated group as a main component, (ii) an oxygen absorbent accelerator and optionally (iii) a carrier substance.

9. The vacuum heat insulator of claim 8, wherein the unsaturated fatty acid compound is an unsaturated fatty acid having 10 or more carbon atoms with at least one double bond between adjacent carbon atoms, or a salt or an ester of the unsaturated fatty acid.

10. The vacuum heat insulator of claim 9, wherein said unsaturated fatty acid compound is fats and oils containing esters of the unsaturated fatty acid, esters and metal salts of the unsaturated fatty acid.

11. The vacuum heat insulator of claim 8, wherein said chain hydrocarbon polymer having an unsaturated group includes a chain hydrocarbon polymer and derivatives thereof having 10 or more carbon atoms and at least one double bond between adjacent carbon atoms.

12. The vacuum heat insulator of claim 8, wherein said oxygen absorbent accelerator is an transition metal salt.

13. The vacuum heat insulator of claim 12, wherein said transition metal is a salt of Fe, Co or Mn.

14. The vacuum heat insulator of claim 1, wherein said dehydrating agent is selected from the group consisting of a paper or synthetic paper comprising a natural pulp or a synthetic pulp, silica gel, alumina, activated carbon, zeolite, pearlite, activated clay, quick lime, barium oxide, calcium chloride, barium bromide, calcium sulfate, magnesium chloride, magnesium oxide, magnesium sulfate, aluminum sulfate, sodium sulfate, sodium carbonate, potassium carbonate and zinc chloride.

15. The vacuum heat insulator of claim 1, wherein said acidic gas absorbent is selected from the group consisting of an oxide, a hydroxide, a carbonate, an organic salt and an organic amine of an alkali metal or alkaline earth metal.

16. The vacuum heat insulator of claim 1, wherein the ratio of components constituting the oxygen absorbent is from 0.01 to 40 parts by weight of the oxidation accelerating agent and from 1 to 5,000 parts by weight of the carrier substance per 100 parts by weight of a main component selected from an unsaturated fatty acid compound and a chain hydrocarbon polymer having an unsaturated group.

17. The vacuum heat insulator of claim 1, wherein the amount of the oxygen absorbent is from 0.1 to 10 parts by weight, the amount of the dehydrating agent is from 0.5 to 50 parts by weight and the amount of the acidic gas absorbent is from 0.5 to 20 parts by weight per 100 parts by weight of core material.

18. A thermally insulated container comprising a vacuum chamber containing, under vacuum, a vacuum heat insulator comprising an oxygen absorbent which does not require water to absorb oxygen, a dehydrating agent and an acidic gas absorbent.

19. The thermally insulated container of claim 18, wherein the oxygen absorbent comprises (i) at least one of an unsaturated fatty acid compound and a chain hydrocarbon polymer having an unsaturated group as a main component, and (ii) an oxygen absorbent accelerator.

20. The thermally insulated container of claim 18, wherein the oxygen absorbent further comprises a carrier substance.

21. A vacuum package comprising a sealed package having gas barrier properties containing, under vacuum, an oxygen absorbent which does not require water to absorb oxygen, a dehydrating agent and an acidic gas absorbent.

22. The vacuum package of claim 21, wherein the sealed package is a laminated film package comprising a metal foil or a metal oxide deposited on polyvinylidene chloride, polyvinyl alcohol, polyester, polypropylene, polyamide or polyethylene film.

23. The vacuum package of claim 21, wherein the oxygen absorbent, the dehydrating agent and the acidic gas absorbent are contained in a gas permeable package.

* * * * *